(12) United States Patent
Leum

(10) Patent No.: US 10,479,624 B2
(45) Date of Patent: Nov. 19, 2019

(54) DOCK HOUSING

(71) Applicant: Grant Leum, Excelsior, MN (US)

(72) Inventor: Grant Leum, Excelsior, MN (US)

( * ) Notice: Subject to any disclaimer, the term of this patent is extended or adjusted under 35 U.S.C. 154(b) by 228 days.

(21) Appl. No.: 15/478,389

(22) Filed: Apr. 4, 2017

(65) Prior Publication Data

US 2018/0282995 A1 Oct. 4, 2018

(51) Int. Cl.
*B66B 9/00* (2006.01)
*B65G 69/28* (2006.01)

(52) U.S. Cl.
CPC .................. *B65G 69/287* (2013.01)

(58) Field of Classification Search
CPC .... E04B 1/34336; E04B 1/34352; E04B 1/35; E04B 1/3511; E04B 2001/3577; E04B 2001/3588; B65G 69/2805; B65G 69/28; B65G 69/2811; B65G 69/287; B65G 69/00
USPC ....... 52/29, 2.12, 34, 36.1, 36.6, 111, 122.1, 52/745.02, 745.05; 14/69.5, 71.3, 71.5
See application file for complete search history.

(56) References Cited

U.S. PATENT DOCUMENTS

| | | | | |
|---|---|---|---|---|
| 2,904,802 A * | 9/1959 | Hartman | ............ | B65G 69/2852 14/71.3 |
| 5,394,662 A * | 3/1995 | Giuliani | ............... | B65G 69/008 52/173.2 |
| 5,622,016 A * | 4/1997 | Frommelt | ............ | B65G 69/008 52/11 |
| 5,675,945 A * | 10/1997 | Giuliani | ............... | B65G 69/008 49/312 |
| 5,953,868 A * | 9/1999 | Giuliani | ............... | B65G 69/008 52/173.2 |
| 6,122,789 A * | 9/2000 | Stephenson | ........... | B64F 1/3055 14/71.1 |
| 7,146,673 B1 * | 12/2006 | Digmann | ............. | B65G 69/003 14/71.5 |
| 8,424,254 B2 * | 4/2013 | Ballester | ............ | B65G 69/2876 52/173.2 |
| 9,131,509 B2 * | 9/2015 | Malkawi | ............... | H04W 74/06 |
| 2003/0199996 A1 * | 10/2003 | Reynard | ............. | B65G 69/001 700/17 |

(Continued)

FOREIGN PATENT DOCUMENTS

| CN | 104060857 A | 9/2014 |
|---|---|---|
| WO | WO2016137315 A1 | 9/2016 |

*Primary Examiner* — Chi Q Nguyen
(74) *Attorney, Agent, or Firm* — Jansson Munger McKinley & Kirby Ltd.

(57) ABSTRACT

An apparatus and related method for a dock housing for a pre-existing loading dock. The dock housing includes a base with top and bottom surfaces and front, back and opposed sidewalls. The front wall has integral fork pockets for interaction with forks on a fork truck for movement of the base into a desired location and the top surface has an opening to receive a dock leveler into such opening. Also included is a modular frame mounted onto the base in sections, the sections including a frame-front wall, opposed frame-sidewalls and a frame-top wall, the frame-front wall having a trailer-receiving opening to receive a trailer, the frame-sidewalls including a slotted-base attachment for securement of the base and sidewalls together. The dock housing is formed by securing the frame-sidewalls to a wall of a pre-existing building as well as securing the base, the frame-front wall and the frame-top wall together.

7 Claims, 11 Drawing Sheets

(56) References Cited

U.S. PATENT DOCUMENTS

2008/0184503 A1* 8/2008 Andersen ........... B65G 69/2823
14/71.3
2008/0302029 A1* 12/2008 Desjardins ........... B65G 69/008
52/173.2
2016/0280478 A1* 9/2016 Gleason ............... B65G 69/008

* cited by examiner

DOCK HOUSING

FIELD OF THE INVENTION

This invention relates to dock housings and more particularly to a dock housing which is modular and easily moveable.

BACKGROUND OF THE INVENTION

A variety of dock housings have been devised which are constructed over docks built into buildings. Dock housings protect the dock as well as provide shelter from the weather during loading and unloading of cargo onto trucks and the like.

One such device is seen WO 2016137315 (Fijnvandraat) which discloses a dock leveler with rolling cover. The cover is a light weight aluminum cover. A similar device is disclosed in CN 104060857 which discloses a permanently built dock shelter structure with an adjustment plate and door seal.

Dock housings of the prior art have certain shortcomings and disadvantages to which this device is drawn. Specifically, it would be advantageous to have a dock housing which is modular and able to be easily assembled and disassembled without the need for concrete construction. It would also be advantageous to have a dock housing which integrates conventional loading dock levelers. It would also be advantageous to have a dock housing which includes a slotted base attachment to allow the install to be adjusted based on building wall conditions.

In summary, there are problems and shortcomings in dock housings of the prior art and it is to these needs that this device is drawn.

OBJECTS OF THE INVENTION

It is an object of this invention to provide a dock housing which is modular and able to be easily assembled and disassembled without the need for concrete construction.

Another object of this invention is to provide such a dock housing which integrates conventional loading dock levelers.

Yet another object of this invention is to provide a dock housing which includes a slotted base attachment to allow the install to be adjusted based on building wall conditions.

These and other objects of the invention will be apparent from the following descriptions and from the drawings.

SUMMARY OF THE INVENTION

In a preferred embodiment of the present invention a dock housing for a pre-existing loading dock having a base including top and bottom surfaces and front, back and opposed sidewalls, the front wall having integral fork pockets for interaction with forks on a fork truck for movement of the base into a desired location, the top surface having an opening to receive a dock leveler into such opening and a modular frame mounted onto the base in sections, such sections including a frame-front wall, opposed frame-sidewalls and a frame-top wall, the frame-front wall having a trailer-receiving opening to receive a trailer, the frame-sidewalls including a slotted-base attachment for securement of the base and sidewalls together. Each of the frame-sidewalls are secured to a wall of a pre-existing building, the base, the frame-front wall and the frame-top wall, thereby assembling the modular frame and dock housing.

Preferably, the frame-sidewalls are bolted to the wall of a pre-existing building. It is also preferable that the top surface includes one or even two openings to receive the number of corresponding dock levelers into such openings and the frame-front wall includes corresponding trailer-receiving openings. In some preferred embodiments, the modular dock housing includes a door for opening and closing the trailer-receiving opening. In preferred embodiments, the opening can be configured to receive a variety of dock levelers of different sizes and shapes.

It is highly preferable that the base includes a slotted-attachment for connection of the frame-sidewalls to the base and that the base includes adjustable front plates. It is also highly preferably that the base and modular frame are removable and able to be transported to different locations.

A preferred method for constructing a modular dock housing for a pre-existing loading dock includes the steps of moving a base to a desired location, the base including top and a bottom surfaces and front, back and opposed sidewalls, the front wall having integral fork pockets for interaction with forks on a fork truck for movement of the base into a desired location, the top surface having an opening to receive a dock leveler into such opening; providing a modular frame mounted including a frame-front wall, opposed frame-sidewalls and a frame-top wall, the frame-front wall having a trailer-receiving opening to receive a trailer, the frame-sidewalls including a slotted-base attachment for securement of the base and sidewalls together; bolting the frame-front wall to each frame-sidewall and then bolting the frame-front wall and frame-sidewalls to the base; installing siding onto the frame-sidewalls; securing the frame-top wall onto both of the frame-sidewalls; sliding the forks on a fork truck into the integral fork pockets; moving the base and modular frame with a fork truck into position against a pre-existing building wall; and anchoring the frame-top wall and frame-sidewalls onto the wall of the preexisting building.

Preferably, the moving step includes a top surface having two openings to receive two dock levelers into such openings. In preferred embodiments, the providing step includes the frame-front wall having two trailer-receiving openings. It is also preferred that the providing step includes a door for opening and closing the trailer-receiving opening.

In preferred embodiments, the moving step includes a slotted-attachment on the base for connection of the frame-sidewalls to the base and the providing step includes adjustable front plates on the base. Preferably, the moving step also includes the opening being configured to receive a variety of dock levelers of different sizes and shapes.

DETAILED DESCRIPTION OF PREFERRED EMBODIMENTS

Figure 1:
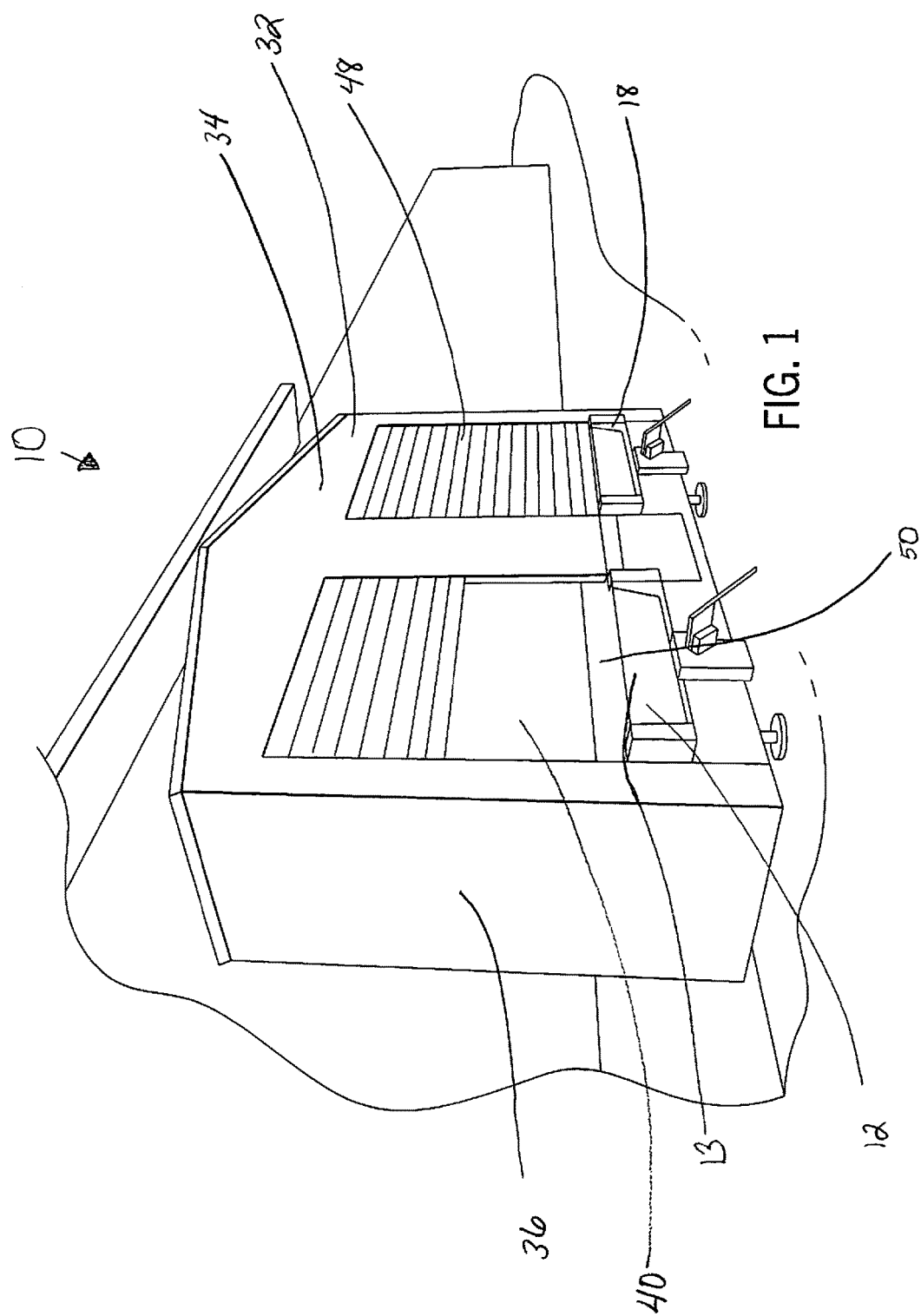
FIG. 1 is a perspective view of a fully-assembled dock housing.

A preferred embodiment of the present invention is shown in FIGS. 1-11. FIGS. 1-11 illustrate a dock housing 10 for a pre-existing loading dock 12. Dock house 10 includes a base 13 with top and bottom surfaces 14, 16 and front, back and opposed sidewalls 18, 20, 22, front wall 18 having integral fork pockets 24 for interaction with forks on a fork truck 26 for movement of base 13 into a desired location, top surface 14 having an opening 28 to receive a dock leveler 30 into such opening 28. Dock house 10 also includes a modular frame 32 mounted onto base 13 in sections, such sections including a frame-front wall 34, opposed frame-sidewalls 36 and a frame-top wall 38, frame-front wall 34 having a trailer-receiving opening 40 to receive a trailer (not shown). Frame-sidewalls 36 including a slotted-base attachment 42 for securement of base 13 and frame-sidewalls 36 together.

FIG. 1 illustrates dock housing 10 shown with two trailer-receiving openings 40. Dock housing 10 can be configured to have as many or as few trailer-receiving openings 40 as required by a particular user. FIG. 1 also illustrates the parts of each dock housing as well as shows the dock floor 50 inside dock housing 10 and the adjustable front plates 46 on base 13.

Figure 2:
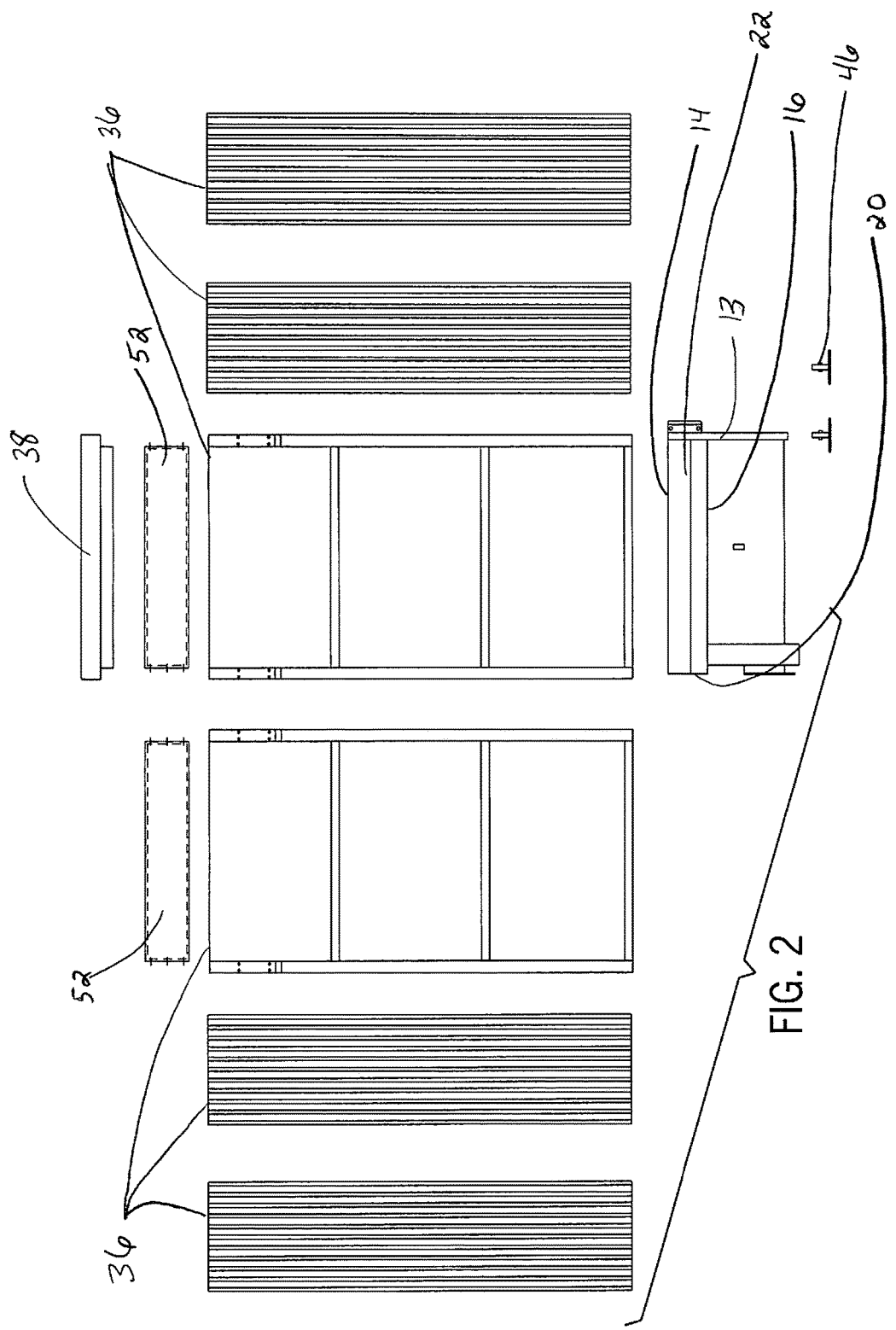
FIG. 2 is an exploded view illustrating the base, frame-sidewalls and frame top-wall.

FIG. 2 shows the main large structural parts of dock housing 10 in a non-assembled state. FIG. 2 illustrates that the opposed frame sidewalls have a structural skeleton piece as well as siding/sheathing which is put onto the structural skeleton piece in the assembly process. A header 52 and frame top-wall 38 are also used in the assembly process of dock housing 10.

Figure 3:
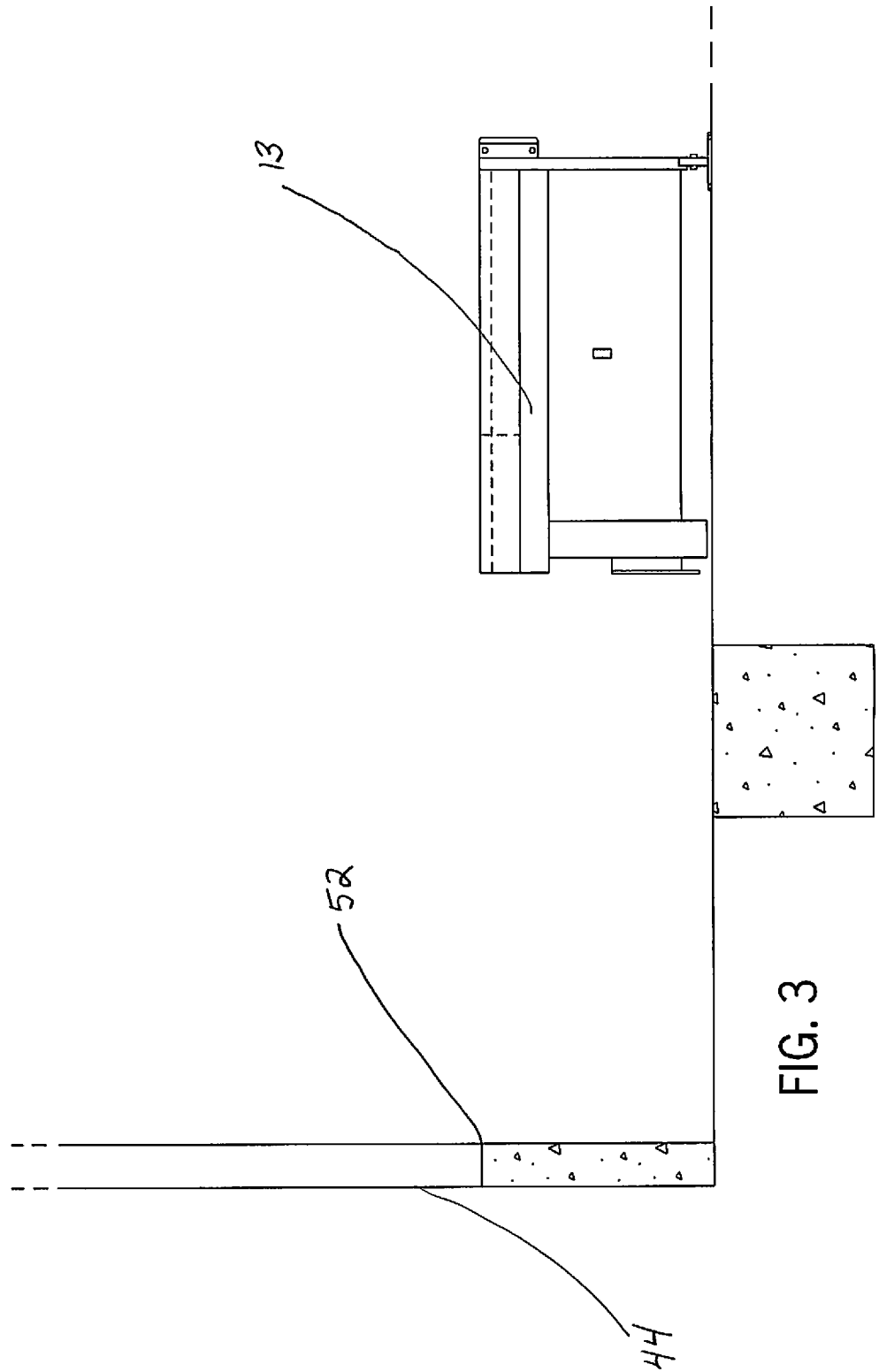
FIG. 3 is a perspective view of the base set away from a building.

FIG. 3 illustrates base 13 before opposed frame-sidewalls 36 and frame top-wall 38 are assembled onto base 13 and before base 13 is moved into position against wall of building 44 and secured to wall of building 44.

As seen best in FIGS. 1 and 6-8 frame-sidewalls 36 are secured to a wall 44 of a pre-existing building as are base 13, frame-front wall 34 and frame top wall 38. These pieces assembled together form modular frame 32 and completed dock housing 10.

Figure 4:
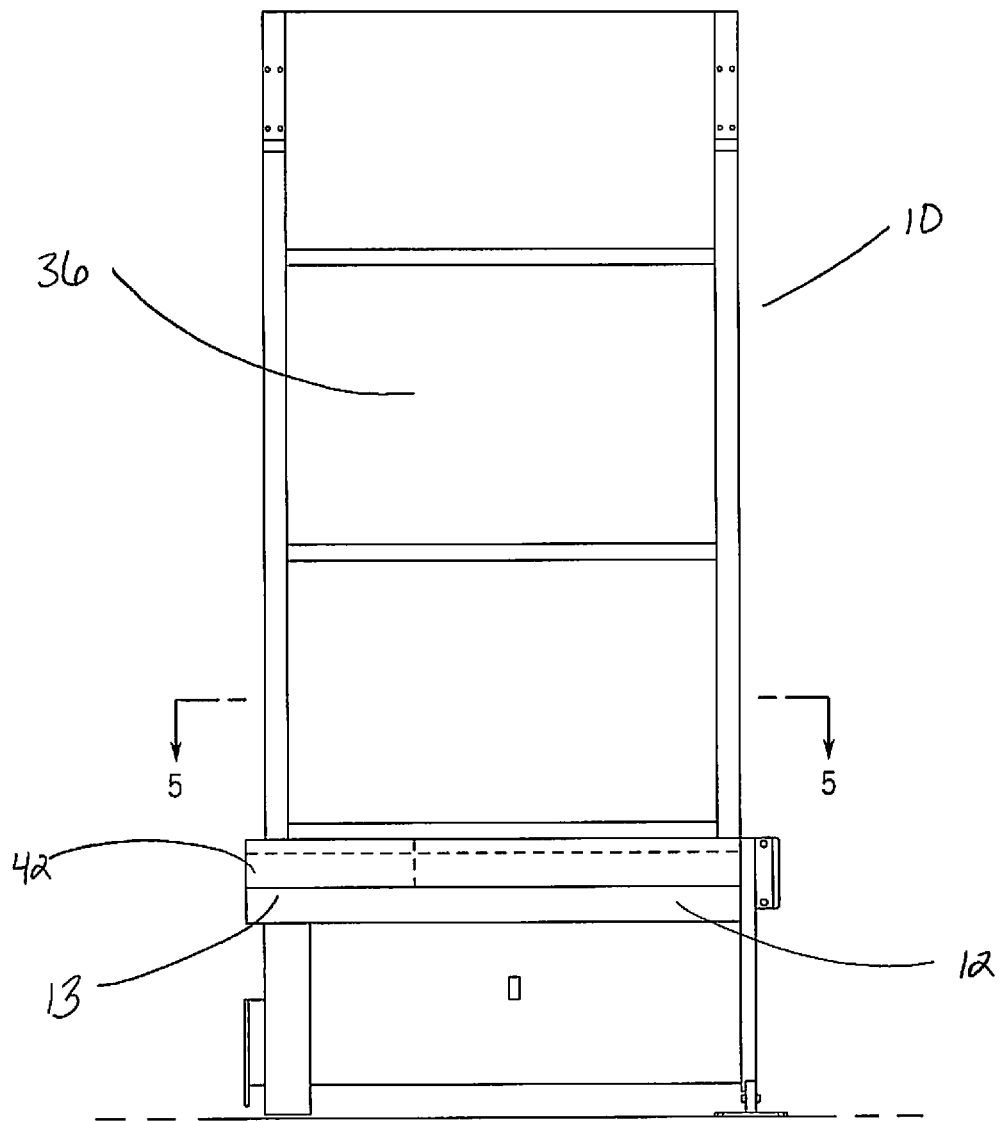
FIG. 4 is a perspective view of the base and frame-sidewalls without the sidewall covering.
Figure 5:
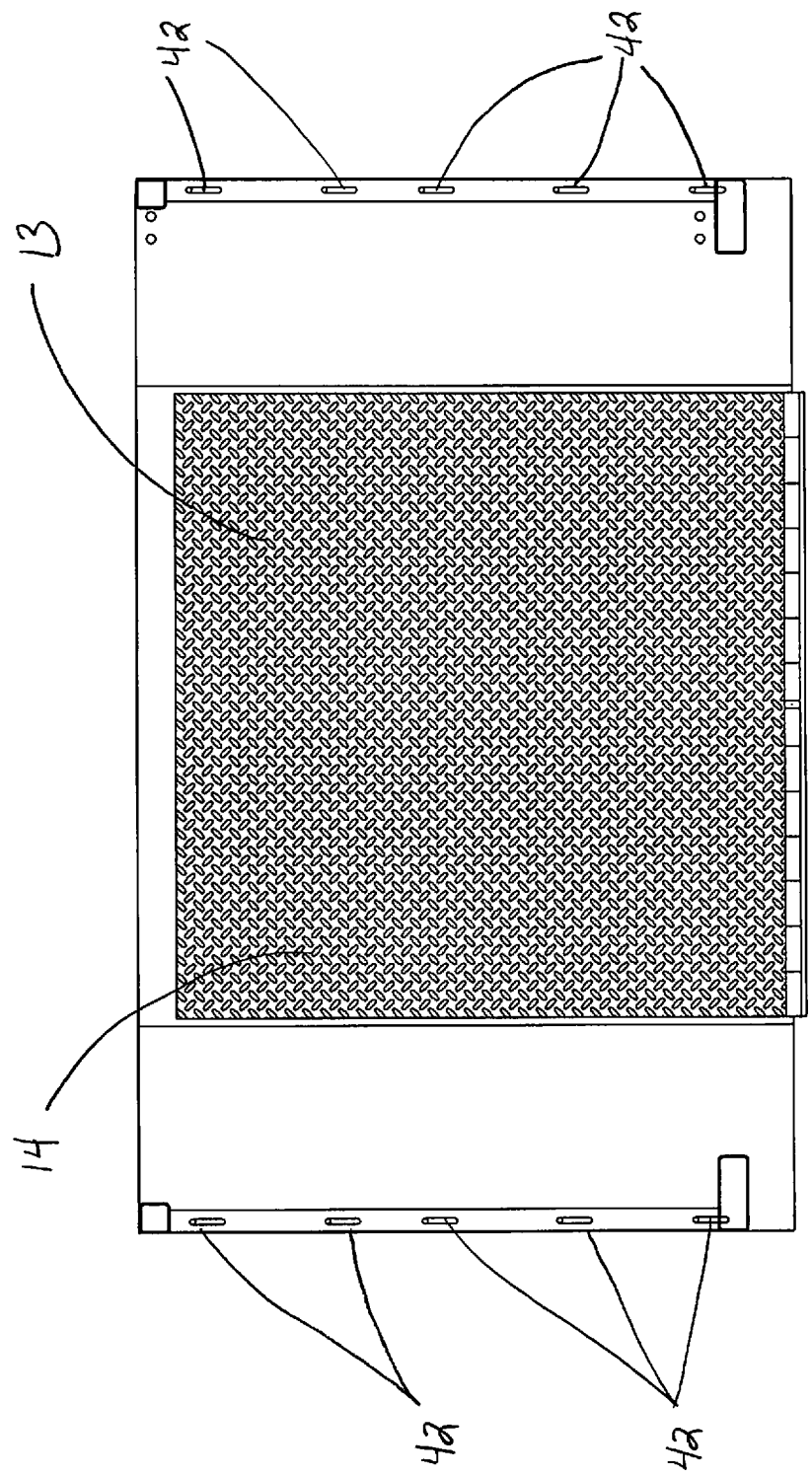
FIG. 5 is a top view of the base illustrating the slotted-base attachment.
Figure 7:
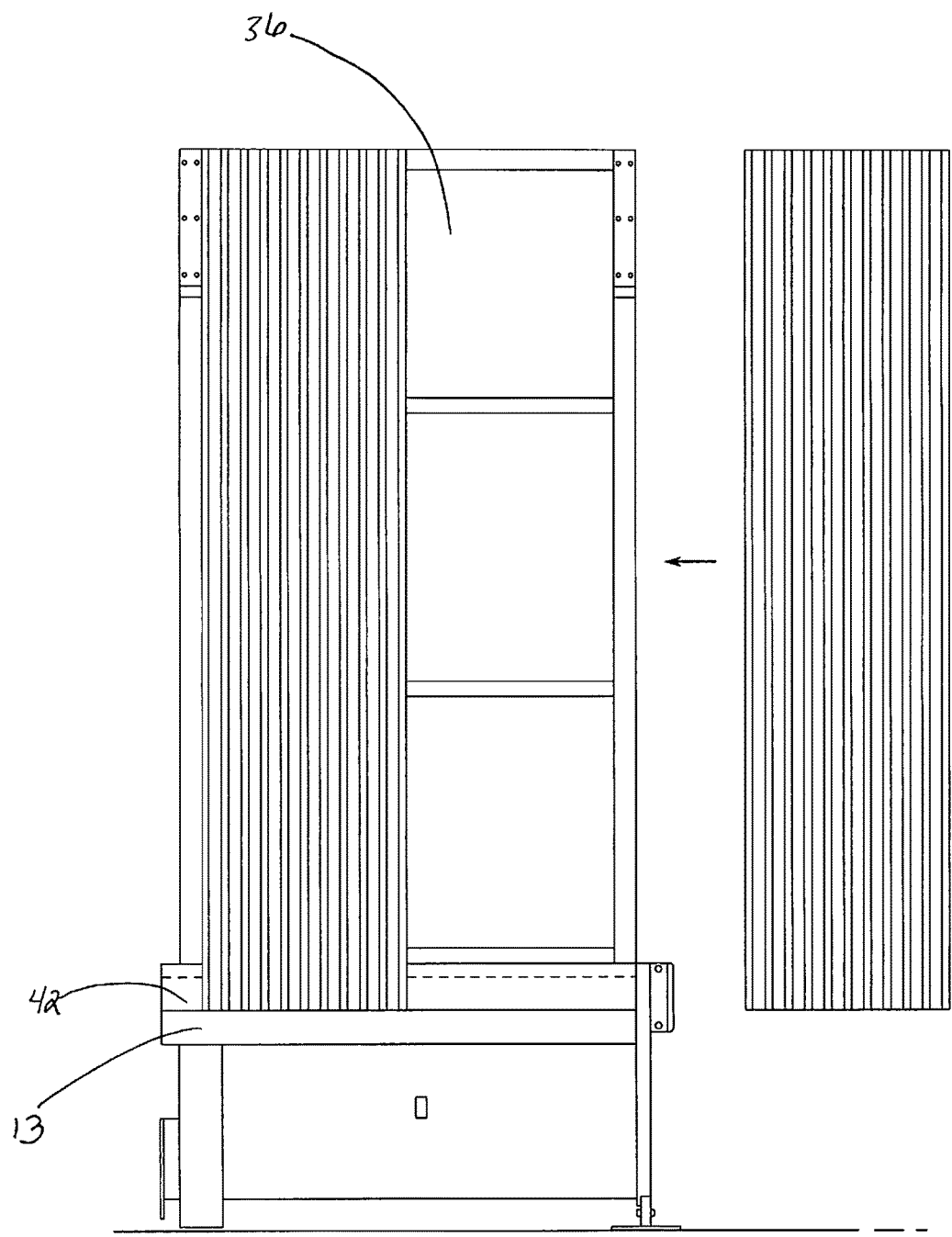
FIG. 7 is a perspective view of the frame-sidewalls with the sidewall covering partially attached.

FIGS. 2 and 4-5 illustrate that frame-sidewalls 36 are bolted to wall 44 of a pre-existing building. FIG. 4 shows one of opposed frame-sidewalls 36 without siding/sheathing and secured to base 13. FIG. 7 illustrates siding/sheathing being attached to opposed frame-sidewall 36 to complete opposed frame-sidewall 36. Base 13 includes a slotted-base attachment 42 for connection of frame-sidewalls 36 to base 13 as shown in FIG. 5. Base 13 also includes adjustable front plates 46 which can take on numerous configurations and are shown as adjustable feet structures in FIGS. 1-2.

Figure 6:
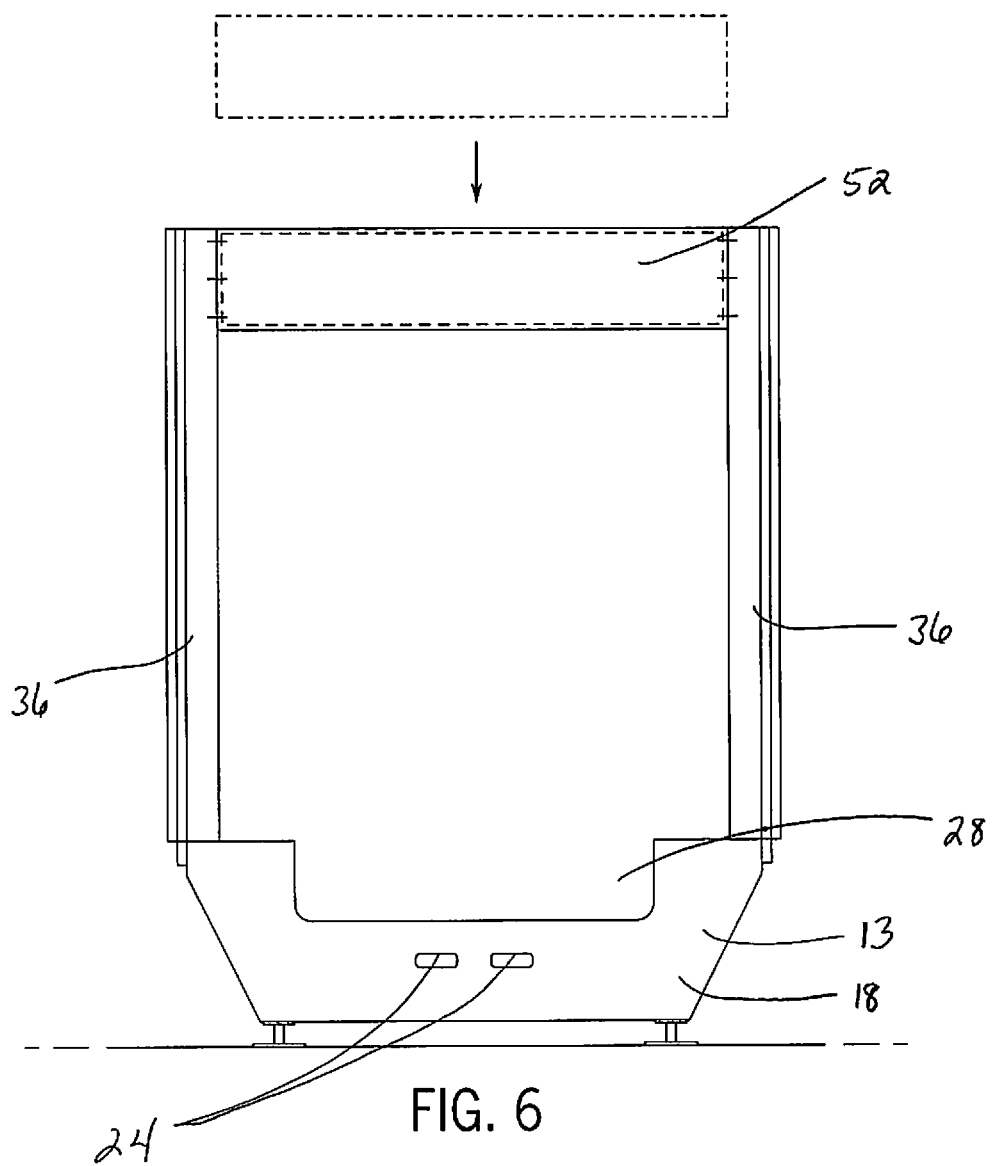
FIG. 6 is a front view of the base with the frame-sidewalls attached.

FIG. 6 illustrates partially assembled dock housing 10 and particularly shows base 13 with front wall 18 having integral fork pockets 24 for interaction with forks on a fork truck 26 for movement of base 13 into a desired location. FIG. 6 also shows top surface 14 having an opening 28 to receive a dock leveler 30 into such opening 28.

Figure 8:
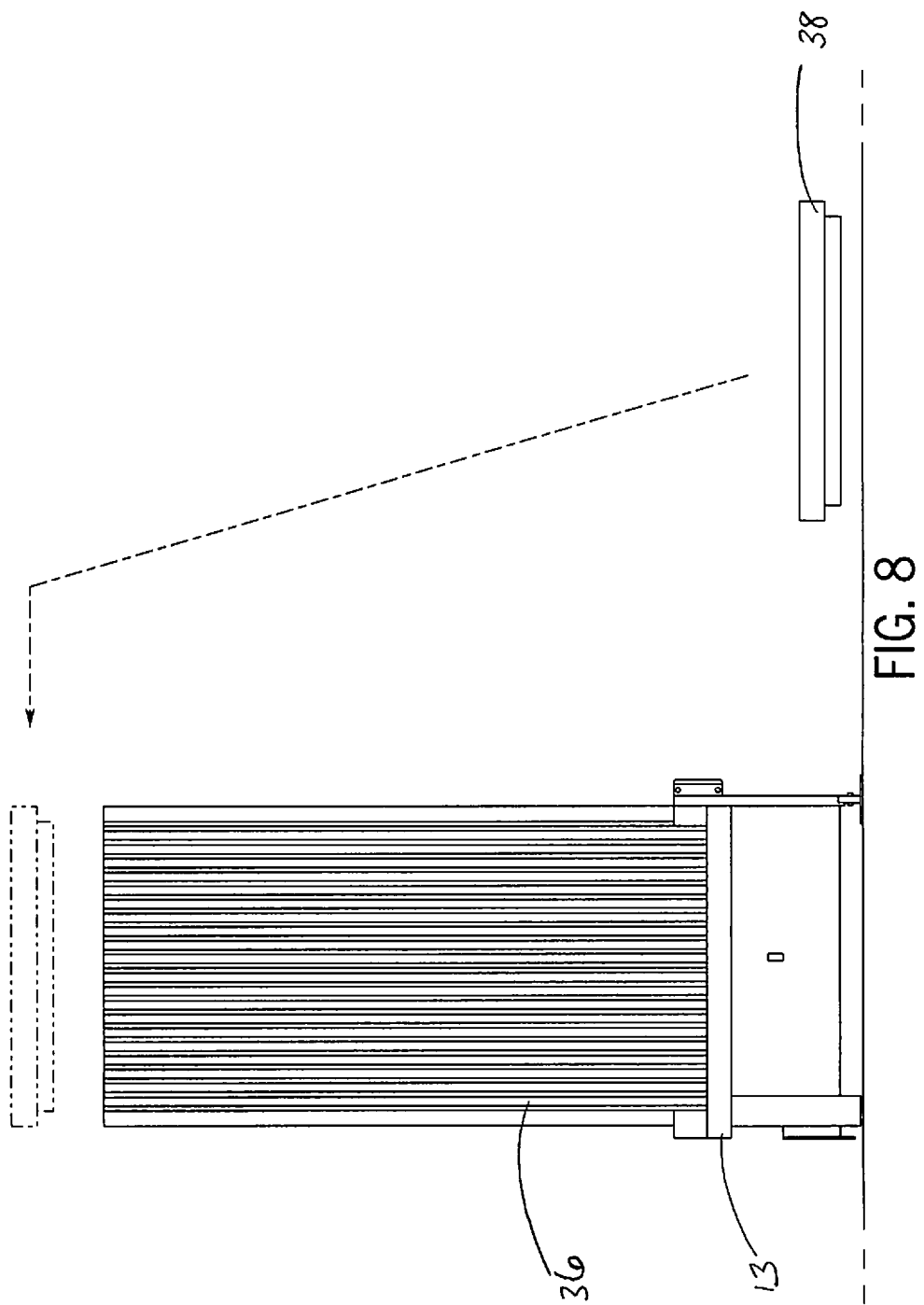
FIG. 8 is a perspective view of the frame-sidewalls and illustrating installation of the frame top-wall.
Figure 9:
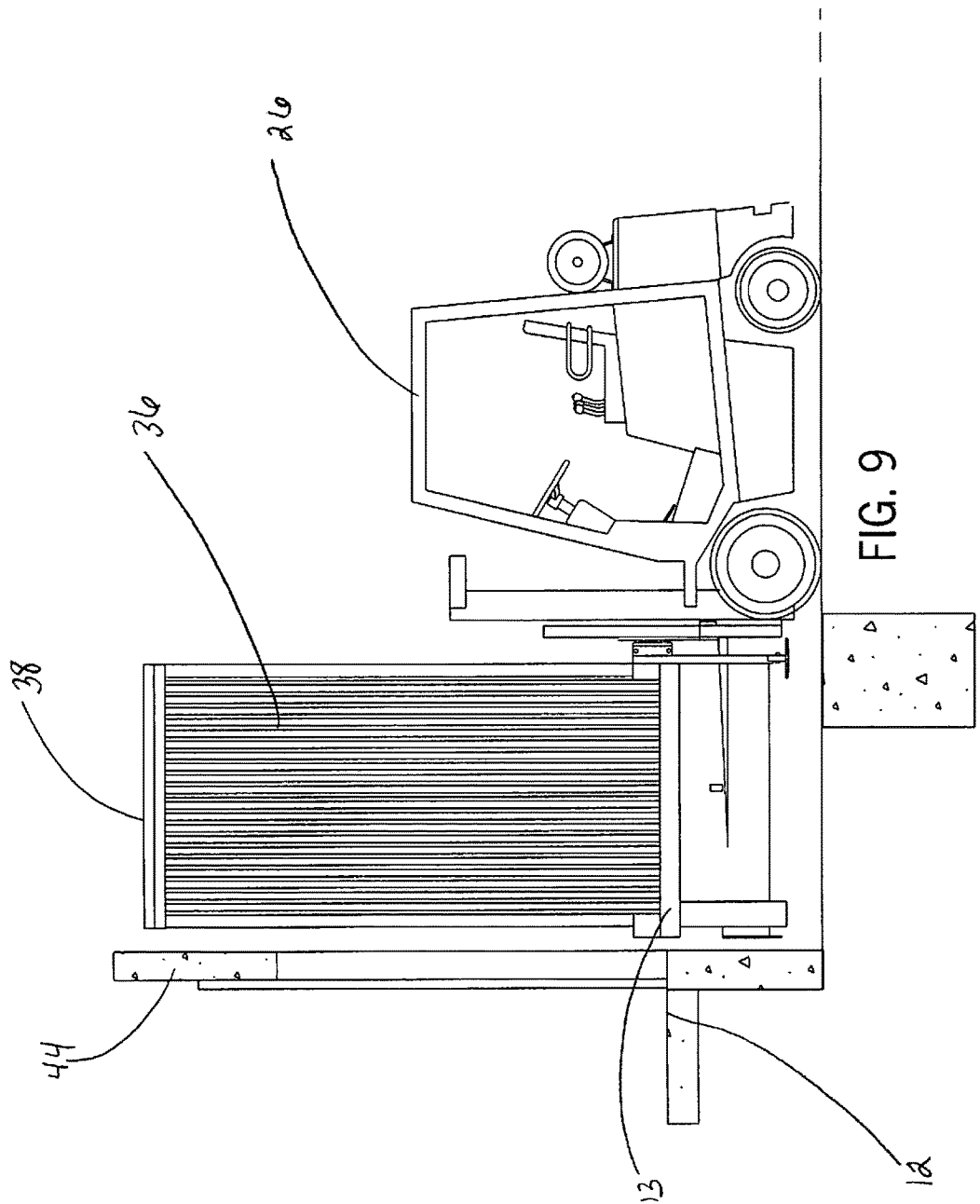
FIG. 9 is a perspective view of a fork truck moving the dock housing into place at a loading dock.

FIG. 8 shows dock housing 10 with opposed frame-sidewalls 36 and placement of frame top-wall 38 into the top of modular frame 32. Dock housing 10 can be moved into place against wall of building 44 through use of integral fork pockets 24 and with a fork truck 26 or other similar machinery as seen in FIG. 9. FIG. 9 illustrates that base 13 and modular frame 32 are easily removable and able to be transported to different locations.

Figure 10:
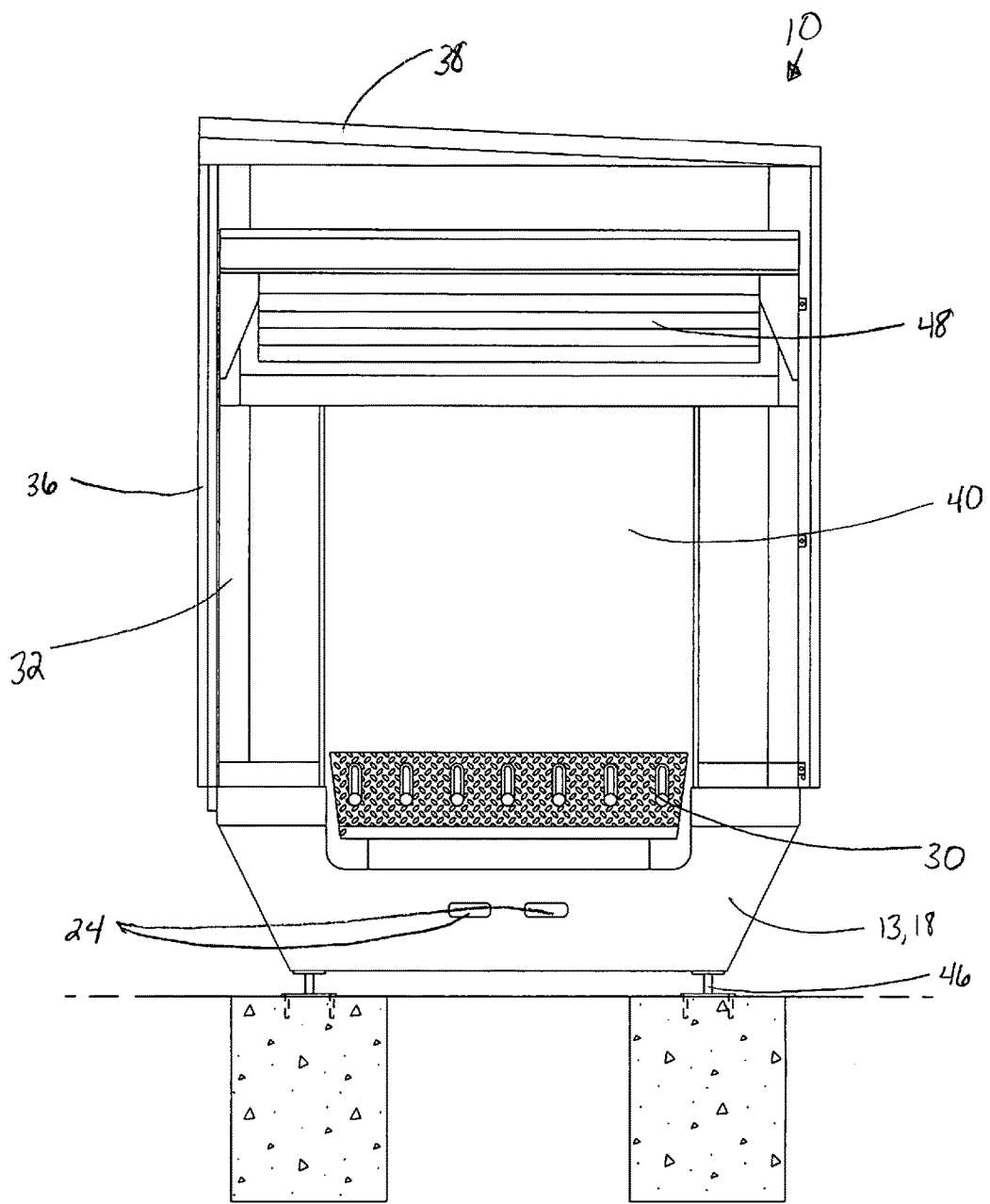
FIG. 10 is a front view of the dock housing with two trailer-receiving openings.
Figure 11:
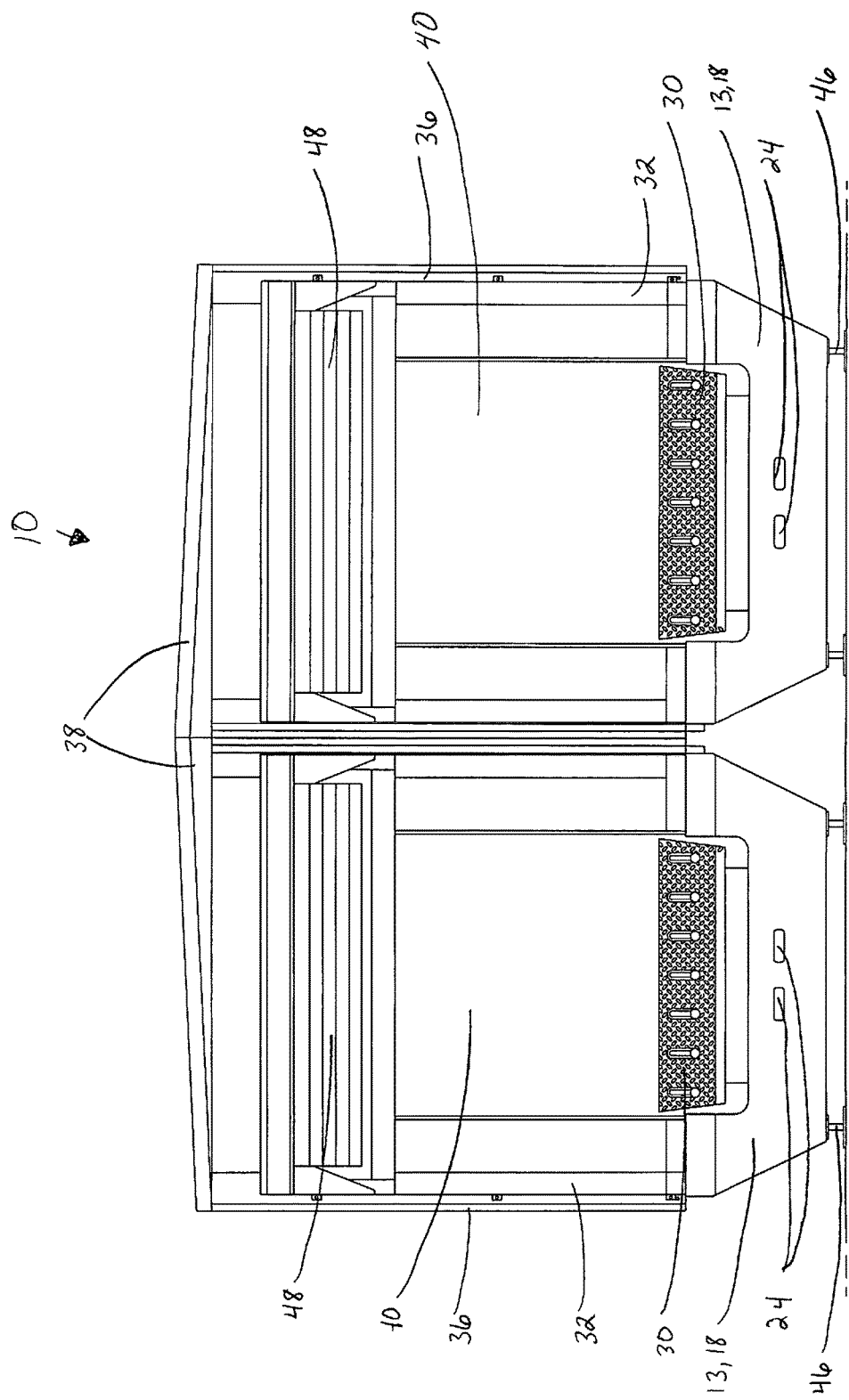
FIG. 11 is a front view of another embodiment of the dock housing with one trailer-receiving opening.

Modular dock housing 10 includes a door 48 for opening and closing trailer-receiving opening 40 as seen best in FIG. 10. Opening 28 in top surface 14 can be configured to receive a variety of dock levelers of different sizes and shapes. FIGS. 10 and 11 illustrate fully-assembled dock housings 10. FIG. 10 illustrates dock housing 10 with a single trailer-receiving opening 40 whereas FIG. 11 shows two trailer-receiving openings 40.

FIG. 11 also shows that top surface 14 can include two openings 28 to receive two dock levelers 30 into such openings 28 and frame-front wall 34 includes two trailer-receiving openings 40.

The application also includes an inventive method for constructing a modular dock housing for a pre-existing loading dock. The inventive method includes the steps of first moving base 13 to a desired location, base 13 including top and a bottom surfaces 14, 16 and front 18, back 20 and opposed sidewalls 22. Front wall 18 has integral fork pockets 24 for interaction with forks on a fork truck 26 for movement of base 13 into a desired location and top surface 14 having an opening 28 to receive a dock leveler 30 into such opening 28.

Next, modular frame 32 is provided and includes frame-front wall 34, opposed frame-sidewalls 36 and frame-top wall 38. Frame-front wall 34 has a trailer-receiving opening 40 to receive a trailer, and frame-sidewalls 36 include slotted-base attachment 42 for securement of base 13 and frame-sidewalls 36 together. Frame-front wall 34 is then bolted to each frame-sidewall 36 and then frame-front wall 34 and frame-sidewalls 36 are bolted to base 13. Siding/sheathing is installed onto frame-sidewalls 36 and then frame-top wall 38 is secured onto both of opposed frame-sidewalls 36.

The method next consists of sliding the forks on fork truck 26 into integral fork pockets 24 and moving base 13 and modular frame 32 with fork truck 26 into position against a pre-existing building wall 44. Finally, frame-top wall 38 and frame-sidewalls 36 are anchored onto the wall of the pre-existing building 44.

The inventive method also includes top surface 14 having one or more openings 28 to receive one or more dock levelers 30 into such corresponding openings 28 as well as frame-front wall 34 having as many trailer-receiving openings 40 as there are corresponding dock levelers 30. One or more corresponding doors 48 are included for opening and closing each trailer-receiving opening 40. Also provided are slotted-base attachments 42 on base 13 for connection of frame-sidewalls 36 to base 13.

Dock housing 10 can be configured to receive a variety of dock levelers of different sizes and shapes.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A dock housing for a loading dock, comprising:

a base including top and bottom surfaces and front, back and opposed sidewalls, the front wall having integral fork pockets for interaction with forks on a fork truck for movement of the base into a desired location, the top surface having an opening to receive a dock leveler into such opening, the base including adjustable front plates which contact a ground surface; and a modular frame mounted onto the base in sections, said sections including a frame-front wall, opposed frame-sidewalls and a frame-top wall, the frame-front wall having a trailer-receiving opening to receive a trailer, the frame-sidewalls including a slotted-base attachment for securement of the base and sidewalls together, the frame-sidewalls being secured to a wall of a building; wherein each of the frame-sidewalls are secured to (a) the base, (b) the frame-front wall, and (c) the frame-top wall, thereby assembling the modular frame and dock housing, the dock housing being movable when unsecured from the wall of a building to allow usage at different locations.

2. The dock housing of claim 1 wherein the frame-sidewalls are bolted to the wall of a building.

3. The dock housing of claim 1 wherein the top surface can include two openings to receive two dock levelers into the two openings and the frame-front wall includes two trailer-receiving openings.

4. The dock housing of claim 1 wherein the modular dock housing includes a door for opening and closing the trailer-receiving opening.

5. The dock housing of claim 1 wherein the base includes a slotted-attachment for connection and securement of the frame-sidewalls to the base.

6. The dock housing of claim 1 wherein the base and modular frame are removable and able to be transported to different locations.

7. The dock housing of claim 1 wherein the opening can be configured to receive a variety of dock levelers of different sizes and shapes.

* * * * *